United States Patent [19]

Biorge et al.

[11] Patent Number: 5,806,045
[45] Date of Patent: Sep. 8, 1998

[54] METHOD AND SYSTEM FOR ALLOCATING AND REDEEMING INCENTIVE CREDITS BETWEEN A PORTABLE DEVICE AND A BASE DEVICE

[75] Inventors: James E. Biorge, Fruit Heights, Utah; Richard T. Hauge, San Jose; Jerome Svigals, Redwood City, both of Calif.

[73] Assignee: CardOne Development Company, Fruit Heights, Utah

[21] Appl. No.: 676,809

[22] Filed: Jul. 8, 1996

Related U.S. Application Data

[63] Continuation of Ser. No. 192,004, Feb. 4, 1994, abandoned.

[51] Int. Cl.[6] .................................................. G06F 17/60
[52] U.S. Cl. ............................. 705/14; 235/380; 705/17
[58] Field of Search ..................................... 395/201, 207, 395/210, 214, 230, 234, 235, 239, 240, 241; 235/379, 380, 383; 705/1, 7, 10, 14, 30, 34, 35, 39, 40, 41, 16, 17

[56] References Cited

U.S. PATENT DOCUMENTS

| | | |
|---|---|---|
| 4,486,827 | 12/1984 | Shima et al. . |
| 4,575,621 | 3/1986 | Dreifus ..................................... 235/380 |
| 4,750,119 | 6/1988 | Cohen et al. . |
| 4,868,900 | 9/1989 | McGuire ................................. 235/380 |
| 4,900,903 | 2/1990 | Wright et al. ........................... 235/380 |
| 4,906,826 | 3/1990 | Spencer ................................... 235/379 |
| 4,926,325 | 5/1990 | Benton et al. . |
| 4,932,485 | 6/1990 | Mori . |
| 4,941,090 | 7/1990 | McCarthy . |
| 4,949,380 | 8/1990 | Chaum . |
| 5,025,372 | 6/1991 | Burton et al. . |
| 5,031,098 | 7/1991 | Miller et al. . |
| 5,056,019 | 10/1991 | Schultz et al. . |
| 5,117,355 | 5/1992 | McCarthy . |
| 5,149,945 | 9/1992 | Johnson et al. .......................... 235/380 |
| 5,175,416 | 12/1992 | Mansvelt et al. ........................ 235/379 |
| 5,200,889 | 4/1993 | Mori . |
| 5,202,826 | 4/1993 | McCarthy . |
| 5,297,026 | 3/1994 | Hoffman . |
| 5,380,991 | 1/1995 | Valencia et al. ........................ 235/383 |
| 5,420,606 | 5/1995 | Begum et al. . |

FOREIGN PATENT DOCUMENTS

| | | |
|---|---|---|
| A-0189691 | 8/1986 | European Pat. Off. . |
| A-0253240 | 1/1988 | European Pat. Off. . |
| A-0276815 | 8/1988 | European Pat. Off. . |
| A-0360613 | 7/1990 | European Pat. Off. . |
| WO-A-9309515 | 5/1993 | WIPO . |
| WO-A-9313488 | 7/1993 | WIPO . |

OTHER PUBLICATIONS

Svigals, J., "Smart Cards: The New Bank Cards", p. 89, MacMillan Publishing Company, 1987.

*Primary Examiner*—Robert A. Weinhardt
*Attorney, Agent, or Firm*—Madson & Metcalf

[57] ABSTRACT

A customer incentive system involving a plurality of service or merchandise providers comprises a customer-carried, portable device (74), a provider device (76), and a base device (72). To earn incentive credits, the customer enters into a transaction with one of the providers participating in the incentive system (70). A transaction amount is derived from the transaction and, based on this amount, an incentive credit amount is computed. The base device (72) performs this computation by deriving an incentive code and cross-referencing this incentive code with all customer incentive codes stored on the customer-carried device (74) and incentive program codes stored on the provider device (76) to derive an incentive rate. This incentive rate is applied to the transaction amount to derive the incentive amount. The incentive amount is stored on the customer-carried device (74). To redeem the incentive credits stored on the customer-carried device (74), the customer enters into a second transaction with the same provider or another participating provider. A second transaction amount is derived from this transaction and the customer may choose to redeem some or all of the incentive credits stored on the customer-carried device (74) to lower the transaction amount. When incentive credits are redeemed, they are subtracted from the incentive amount on the customer-carried device (74). By using a customer-carried device (74), transactions may be conducted off-line. Thus, no concurrent communications link with a central authority is needed.

36 Claims, 12 Drawing Sheets

METHOD AND SYSTEM FOR ALLOCATING AND REDEEMING INCENTIVE CREDITS BETWEEN A PORTABLE DEVICE AND A BASE DEVICE

RELATED APPLICATIONS

This is a continuation of U.S. patent application Ser. No. 08/192,004 filed on Feb. 4, 1994 now abandoned.

FIELD OF THE INVENTION

This invention relates generally to transaction systems and more particularly to a method and system for implementing a multiple provider incentive program in an off-line or a selective on-line environment which allows multiple transactions to be processed for a large number of service and merchandise providers and producers (multiple providers). Included in this system is a dynamic allocation system for collecting, transferring, and distributing funds among participating parties.

DESCRIPTION OF BACKGROUND ART

A wide variety of customer incentive programs have been developed in the past to motivate customers to make purchases from one or a group of service or merchandise providers. These programs, such as coupon and rebate programs, were effective in attracting customers to conduct one-time purchases but, for the most part, were ineffective in motivating customers to return to the same provider for future purchases. This "future business" aspect is an important part of an effective incentive program. Another important aspect of an effective incentive program is variety. Generally, customers want to have a large number of choices with regard to the products and services they buy. In order to have such a variety, a large number of different providers and producers need to participate in the incentive program.

A particular program which has both of the desirable aspects noted above is a large-scale credit incentive program, wherein for each purchase transaction, incentive credits from multiple providers are computed and awarded to the customer. These incentive credits may be redeemed by the customer in a future transaction to pay for all or a part of the future transaction amount. The incentive credits may be earned at any transaction site and redeemed at any transaction site. Because the incentive credits may be redeemed only in a future transaction, the customer has an incentive to return to make another purchase from a participating provider. Since the program is large-scale, and hence, encompasses a large number of different providers, the customers are offered the variety they desire. Therefore, such an incentive program should be effective.

Due to the large number of parties involved, and the simultaneous processing for one or more of these parties, an overall system for coordinating the computation, collection, allocation and redemption of incentive credits is needed in order to implement such an incentive program. The implementation of such a system may take one of several possible forms. First, the system may be implemented as a centralized system wherein for each allocation and redemption of incentive credits, a central authority is concurrently contacted to report the results of the transaction and to obtain authorization for the transaction. Such an implementation would require that a communications link be established with the central authority each time a transaction is conducted. This implementation is slow and inefficient and also imposes a heavy load on communications channels.

As a better alternative, the system may be implemented with a common record-keeping facility and a plurality of off-line transaction sites. In this system, substantially all transactions are conducted off-line, with the results being recorded at the transaction site. At some point after the transaction, the results are transmitted to the record-keeping facility for posting and account reconciliation. The record-keeping facility is not used as a central authority. Rather, authorization of the transaction is done at the transaction site during the transaction, which means that the transaction is conducted more quickly and efficiently. For this reason, this alternative implementation of the system is preferred. Currently, however, there is no system believed to be available which implements the above-described system safely and effectively.

SUMMARY OF THE INVENTION

In accordance with the present invention, there is provided a system for effectively implementing a large-scale incentive program comprising a customer-carried portable device (74) for holding customer-specific information, a provider device (76) for holding provider-specific information, and a base device (72) for coordinating the interaction of the customer and provider devices and for providing an environment in which a transaction may be conducted. In the preferred embodiment, the customer device (74) and the provider device (76) both take the form of a processor card or "smart card". Each card comprises a processor, a read-only memory (ROM) for storing a control program, and a non-volatile memory for storing and securing the customer-specific or provider-specific information. Together, the three devices hold all of the information needed to conduct most transactions. Consequently, there is no need in most transactions to consult a common authority, which means that most transactions may be conducted off-line. There may be certain situations, however, in which a common authority or multiple authorities need to be consulted for further authorization and instructions. In such instances, the selective on-line mode of the present invention is invoked to establish a communications link with the common or multiple authorities to receive authorization and instructions therefrom. This may be done while all other processes are carried out off-line.

In the system of the present invention, each of the devices preferably cooperates with the other devices to carry out the method of the present invention. That is, the various devices operate interactively to carry out an overall process. By operating in this manner, the individual requirements of each of the parties can be taken into account.

In accordance with the method of the present invention, incentive credits are allocated and redeemed by first conducting a transaction between a customer and a provider. From this transaction, a transaction amount is derived. After the transaction amount is derived, an incentive credit total stored in the customer device (74) is checked to determine whether it has a zero value. If so, the customer has no incentive credits to redeem. However, if incentive credits are stored on the customer device (74), the customer is asked whether he wishes to redeem any of the accrued incentive credits, and if so, how many. Where an affirmative response is received, a specified number of incentive credits are redeemed to lower the transaction amount by a discounted amount The number of incentive credits redeemed is subtracted from the incentive credit total stored in the customer device (74) to update this total. Thereafter, the number of incentive credits earned in the present transaction is computed along with the credit incentives offered by additional providers to derive an incentive credit amount. This incentive credit amount is added to the incentive credit total stored in the customer device (74) to again update the total. The newly earned incentive credits may be redeemed in a future transaction. Incentive credits are thus allocated and redeemed in accordance with the present invention.

The process described above is performed for each transaction. At the end of each transaction, information relating to the transaction such as the transaction amount, the discounted amount, and the incentive credit amount is stored. Then, at some point after the transactions (preferably at the end of each day), the stored information is transmitted to a record-keeping facility for records posting and account reconciliation. For each incentive credit allocated, funds and/or discounts from participating providers are electronically transferred to, or the providers pay a certain amount to, a trust account, and for each incentive credit redeemed, the provider redeeming the incentive credits receives a certain amount from the trust account as agreed upon by prior agreement. Funds from the incentive program are thus reallocated from provider to provider.

BRIEF DESCRIPTION OF THE DRAWINGS

FIG. 8 is a detailed flow diagram of the initialization step 130 shown in FIG. 4a.

DETAILED DESCRIPTION OF THE PREFERRED EMBODIMENTS

Before describing the invention in detail, a brief discussion of the considerations underlying the invention will be provided to facilitate a complete understanding of the invention. One of the objects of the present invention is to provide a system for implementing a large-scale customer incentive program. Such a system preferably allows a large number of service and merchandise providers and producers to participate in the incentive program, and also allows customer/provider transactions to be carried out mostly off-line but selectively on-line, if necessary. The off-line aspect of the system gives rise to several system considerations. First, because most transactions are preferably carried out off-line, no communications link is established with a common authority during most transactions. This means that during most transactions, a common authority cannot be relied upon to store or to provide information relating to the incentive program. Rather, this information needs to be stored in some means which may be accessed during the off-line transactions. In view of this consideration, the system of the present invention is preferably implemented using a customer device and a provider device. The customer device stores and maintains incentive program information relating to a specific customer while the provider device stores and maintains incentive program information relating to a specific provider. Together, these two devices provide most of the information needed to carry out a transaction. The customer device is preferably a portable device so that a customer may conveniently carry the device from provider to provider. This portability, combined with the customer-specific incentive program information stored on the device, allows the customer device to be used off-line at any transaction site.

Other considerations prompted by the off-line nature of the system are that of computing multiple card files and incentives, and temporary storage of transaction information. Since most transactions are performed off-line, information relating to the transaction is not transmitted to a record-keeping facility for posting until some time after the transaction is completed. This means that the transactional information needs to be temporarily stored. Preferably, a base device is used for this purpose. The base device preferably also couples to the customer and provider devices to coordinate their interaction. Therefore, the system of the present invention preferably comprises a base device, a provider device, and a customer-carried portable device. Each of these components will be described in greater detail in a subsequent section.

Figure 1:
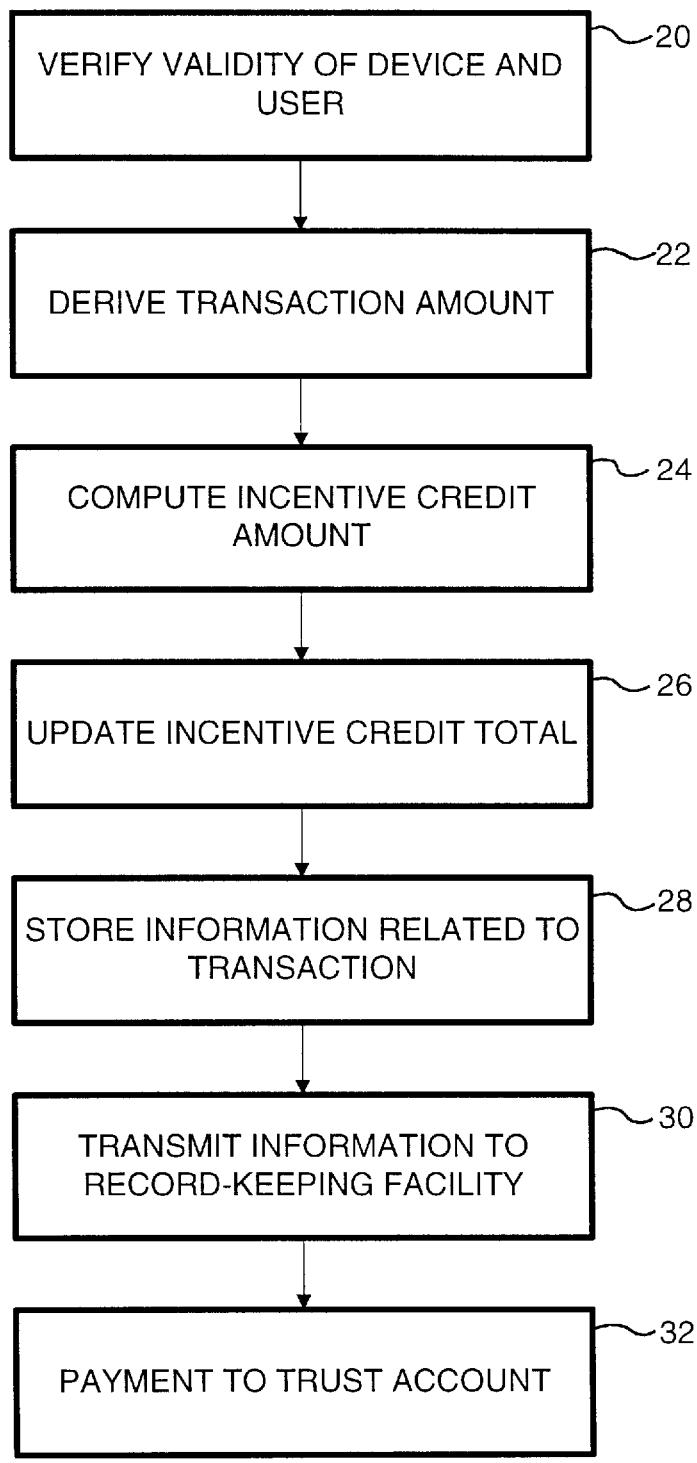
FIG. 1 is a flow diagram of the steps carried out in allocating incentive credits in accordance with the method of the present invention.
Figure 2:
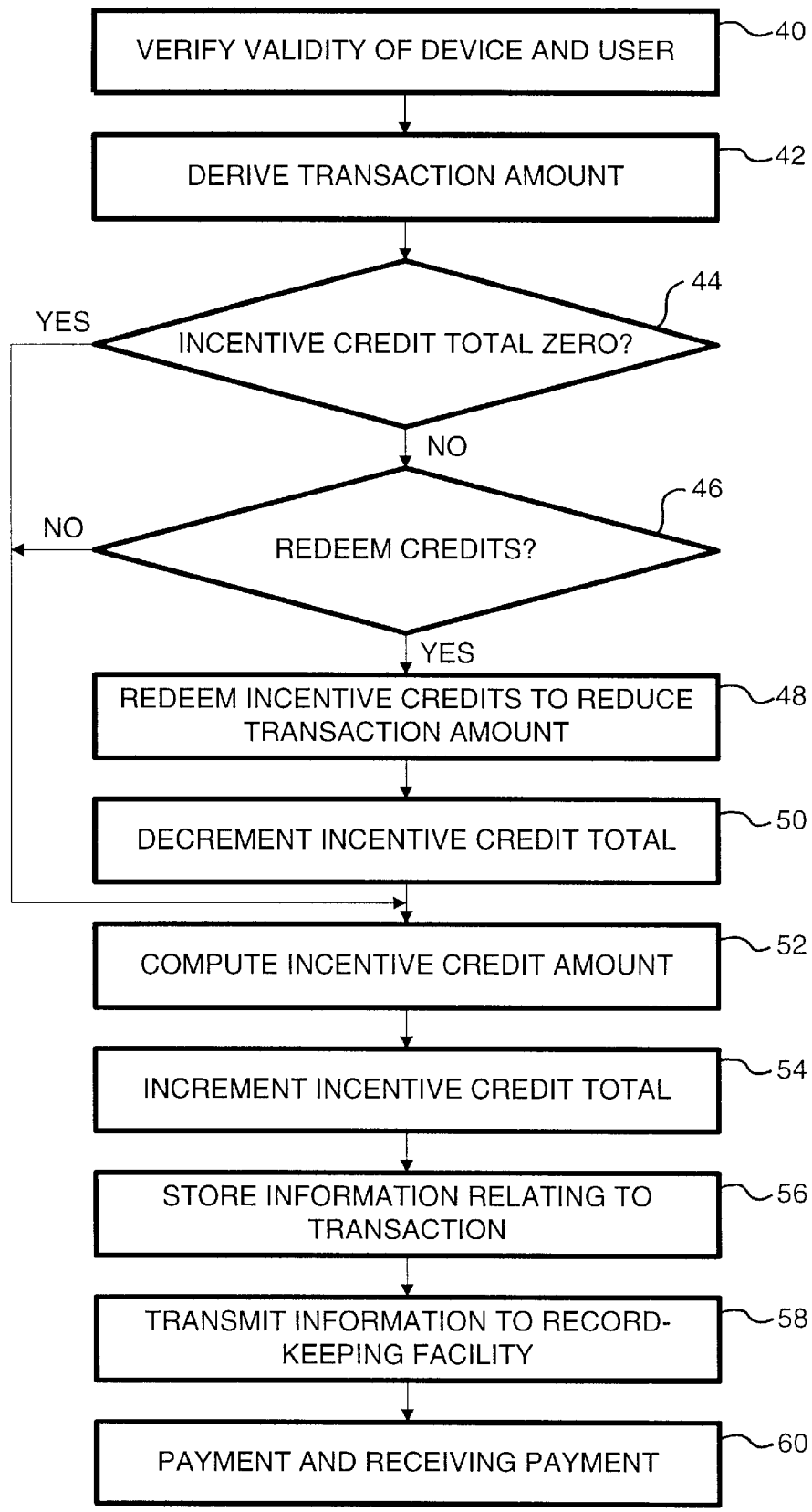
FIG. 2 is a flow diagram of the steps carried out in redeeming and allocating additional incentive credits in accordance with the method of the present invention.

With reference to FIGS. 1 and 2, the method of the present invention will now be described. FIG. 1 illustrates the steps carried out in an initial transaction wherein incentive credits are earned from a first provider, and FIG. 2 shows the steps taken in a subsequent transaction wherein incentive credits are redeemed and earned from a second provider. The first and second providers may be the same provider or they may be different providers participating in the same incentive program. The term provider is used herein to mean a transaction partner to the customer. The provider may be an intermediary who offers goods and services made or performed by other producers, or the provider may be a producer offering its own goods or services. The term provider should be interpreted broadly. For the sake of clarity, it should be noted here that when incentive credits are earned, they are earned not only from the provider participating in the transaction but from all of the providers participating in the incentive program. This is due to the manner in which funds are reallocated among the providers which grant the incentive credits and the providers which redeem the incentive credits (as will be explained later). For the sake of simplicity, however, incentive credits will be described herein as being granted by the provider participating in the transaction.

The term services should also be interpreted broadly. Services may include entertainment, insurance, health care services, banking services, investment consultation, government services, travel services, interactive television, intermediary services such as charity collection services, and other types of services as well. Thus, the present invention has application not just in the sales arena but in many other contexts as well. The following description should be read with this in mind.

Referring to FIG. 1, the first step performed in any transaction is the verification step 20. Because the customer device is portable and thus may be lost, the verification step 20 is necessary to prevent fraudulent use of the portable device. The verification process is twofold. First, the device itself is checked to determine whether it is a proper device for use in the incentive program. This is preferably done by having the portable device exchange encrypted signals with the base device. Second, the user of the device (the customer) is checked to determine whether he is a valid user. User verification is preferably performed by requiring that the user enter a user code and comparing the entered user code with a reference user code stored within the portable device. Only if both the portable device and the user are valid will a transaction between a customer and a provider be allowed to take place. The verification process has thus far been described only in connection with the customer-carried device, but it should be noted that the same process may also be performed on the provider device. This is desirable where the provider device is also a portable device, which it is in the preferred embodiment of the present invention.

After the devices and user are verified to be valid, an off-line transaction between the customer and the provider can commence. At this point, all applicable files stored on the customer device are opened for the purpose of processing and computing incentive credits. The transaction may be a purchase of a good or a service from the provider. From this transaction, a transaction amount is derived 22. Based on the transaction amount, and perhaps some other criteria such as the level of participation by multiple providers, the number of monthly transactions, and other programmable options, an incentive credit amount is computed 24. The incentive credit amount represents the amount of credits to be allocated to the customer from the present purchase. This incentive credit amount is not applicable to the present transaction but may be redeemed only in a future purchase. Thus, the customer has an incentive to enter into a future transaction with the same or another participating provider.

The process of computing the incentive credit amount is a multi-step process. First, based on the transaction, an incentive code is derived from the base device. This incentive code is processed with an incentive program code stored within the provider device and a customer incentive code stored within the customer device to derive an incentive rate. Optionally, additional provider codes, which maybe stored in the customer device and/or the base device, may be used to compute an augmented incentive rate which gives the customer an even greater discount. Thereafter, the incentive rate or the augmented incentive rate is applied to the transaction amount to derive the incentive credit amount. Note that all three devices participate in the computation process. Computing the incentive credit amount in this manner allows the specific needs of each of the parties to be taken into consideration.

To elaborate, suppose that the transaction amount arises from the purchase of a television set. A television set has a particular incentive code (stored in the base device) associated with it. This incentive code is cross-referenced with the incentive program codes stored within the provider device. The provider may have a variety of incentive program codes stored in the provider device, with each code corresponding to a particular incentive plan. Some of these plans may apply to electronic products such as television sets and some may apply to other types of products. By cross-referencing the incentive code with the incentive program codes, the plans which apply to the purchased product are ascertained. The applicable incentive program codes are thereafter cross-referenced with the customer incentive code and other applicable codes stored within the customer device to determine which specific incentive plan applies. For example, the customer may be a member of the "silver" plan so that the "silver incentive plan" applies, and the customer may have a manufacturer's rebated filed on his device. Once the applicable plan is ascertained, the incentive rate is derived and applied to the transaction amount to compute the incentive credit amount. Note that computing the incentive credit amount in accordance with the process above allows each party to set forth its own individualized terms. That is, each provider may have its own customized schedule of incentive plans, and each customer may choose to participate in a specific plan. By allowing multiple parties to participate in the computation process, the specific terms set forth by each party can be taken into account.

As a further example, the incentive credit amount may be computed in a slightly different manner. Instead of using codes to derive an incentive rate, the codes themselves may be incentive rates. For example, the incentive code from the base device may represent an incentive given by the manufacturer of the television set, the incentive program code in the provider device may represent the incentive offered by the provider, and the customer incentive code in the customer device may represent an additional incentive to which the customer is entitled. The customer incentive code may also indicate what portion of the earned incentive credits should be contributed to a charity. Summing up all of these codes, along with codes from additional participating providers (optional), gives the total incentive rate applicable to the transaction amount. The incentive credit amount is computed using this incentive rate. This and other methods may be used for computing the incentive credit amount. The important point is that the incentive credit amount is preferably computed in a process which allows for multiple-party participation.

Once the incentive credit amount is calculated, it is sent to the customer device to update 26 an incentive credit total stored in the customer device. The incentive credit total represents the number of incentive credits the customer has earned in the incentive program. The incentive credit total is updated by adding the incentive credit amount to the total. Thereafter, information relating to the transaction is stored 28 in each of the devices. In the customer device, information such as the transaction amount, the incentive credit amount, the name of the provider, and the product or service purchased is recorded to maintain a journal of all transactions made using the customer device. Similar information is stored in the provider device. In the base device, complete information relating to the transaction, including the identifications of the customer and the provider, the transaction amount, the incentive credits earned, the good or service purchased, and the customer's demographics are stored.

After all of the relevant information is stored, the transaction is completed. In the course of a day, a plurality of transactions are probably conducted in the manner described above, with relevant information being stored at the end of each transaction. At some point after completion of the transactions (preferably at the end of the day), the transaction information stored in the base device is transmitted 30 to a record-keeping facility. Such a facility is utilized to coordinate the allocation and redemption of incentive credits among the various providers. The transmitted information is used for records posting and account reconciliation. At some point after the transactional information is posted with the record-keeping facility, the provider issuing the incentive credits makes a payment 32 to a trust account in an amount which is proportional to the incentive credit amount. Thus, for each incentive credit issued, a provider pays a certain amount into the trust account. The funds accumulated in the trust account are used to compensate providers who redeem incentive credits.

After incentive credits are earned, they may be redeemed in a subsequent transaction with a participating provider. The process of redeeming and/or further earning incentive credits is illustrated in FIG. 2. To redeem incentive credits, a customer enters into a second transaction with either the same provider or another participating provider. But before this second transaction may transpire, verification step 40 is performed. Step 40 is identical to step 20 (FIG. 1) previously described, namely, step 40 verifies that the customer and provider devices are valid devices, and verifies that the user and provider are valid users of the devices. If the users and devices are valid, then a transaction is allowed to take place. A transaction amount is derived 42 from this transaction.

After the transaction amount is derived, the incentive credit total stored in the customer device is checked 44 to determine whether it has a zero value. If so, then there are no incentive credits to be redeemed. However, if the incentive credit total is non-zero, the customer is queried 46 as to whether he wishes to redeem any incentive credits. If not, then the process continues on to step 52, but if the customer wishes to redeem some of his incentive credits, then at least a portion of the incentive credit total is applied 48 to the transaction amount to reduce the transaction amount by a discounted amount. The new adjusted amount (equal to the transaction amount minus the discounted amount) represents the amount, if any, now owed by the customer to the provider. After the incentive credits are redeemed, the incentive credit total stored in the customer device is reduced 50 by the number of incentive credits redeemed.

After previously earned incentive credits are redeemed, the incentive credit amount earned in the current transaction may be computed 52. Computation step 52 is identical to computation step 24. After the incentive credit amount is calculated, the incentive credit total in the customer device is updated 54 to indicate the addition of the incentive credit amount.

Thereafter, information relating to the transaction is recorded 56 in each of the devices. In the customer device, information such as the transaction amount, the incentive credit amount, the number of incentive credits redeemed, the name of the provider, and the product or service purchased is recorded to maintain a journal of all transactions made using the customer device. Similar information is stored in the provider device. In the base device, complete information relating to the transaction, including the identifications of the customer and the provider, the transaction amount, the incentive credits earned, the incentive credits redeemed, the good or service purchased, and the customer's demographics are stored. After all relevant information is properly stored, the transaction is completed.

At some point after the transaction is completed, the information stored in the base device is transmitted 58 to the record-keeping facility for record posting and account reconciliation purposes. Then, at some point after records are posted with the record-keeping facility, the provider settles accounts with the trust account. In the transaction just completed, the provider both redeemed and allocated incentive credits. Thus, the provider will receive 60 from the trust account a payment in an amount proportional to the number of incentive credits redeemed, and will pay into the trust account an amount proportional to the incentive credit amount. Incentive credits are thus allocated and redeemed according to the method of the present invention.

Figure 3:
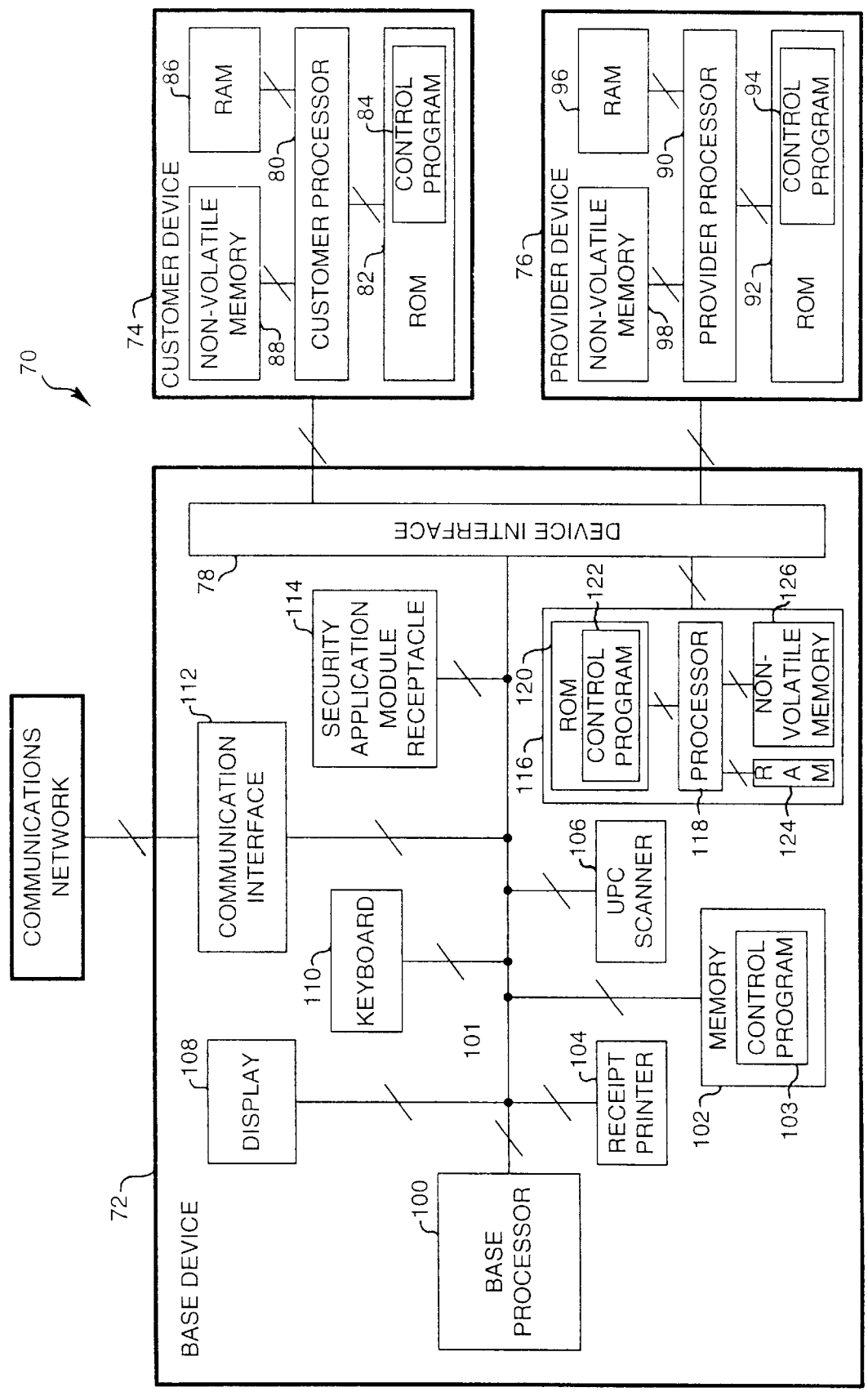
FIG. 3 is a block diagram of a preferred embodiment of the system of the present invention.
Figure 4A:
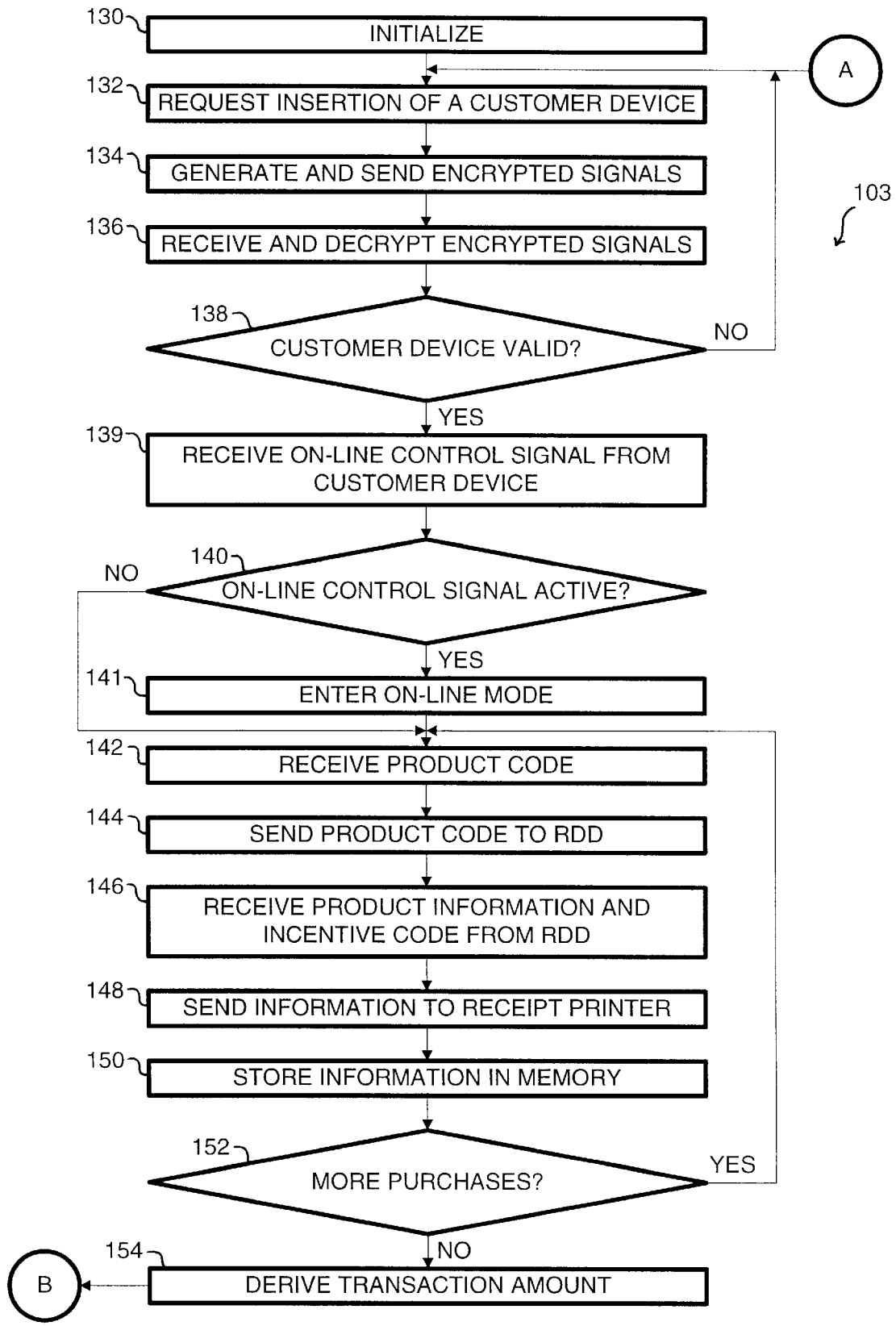
FIGS. 4a–4d provide a flow diagram of the control program 103 executed by the base processor 100 of FIG. 3.
Figure 4B:
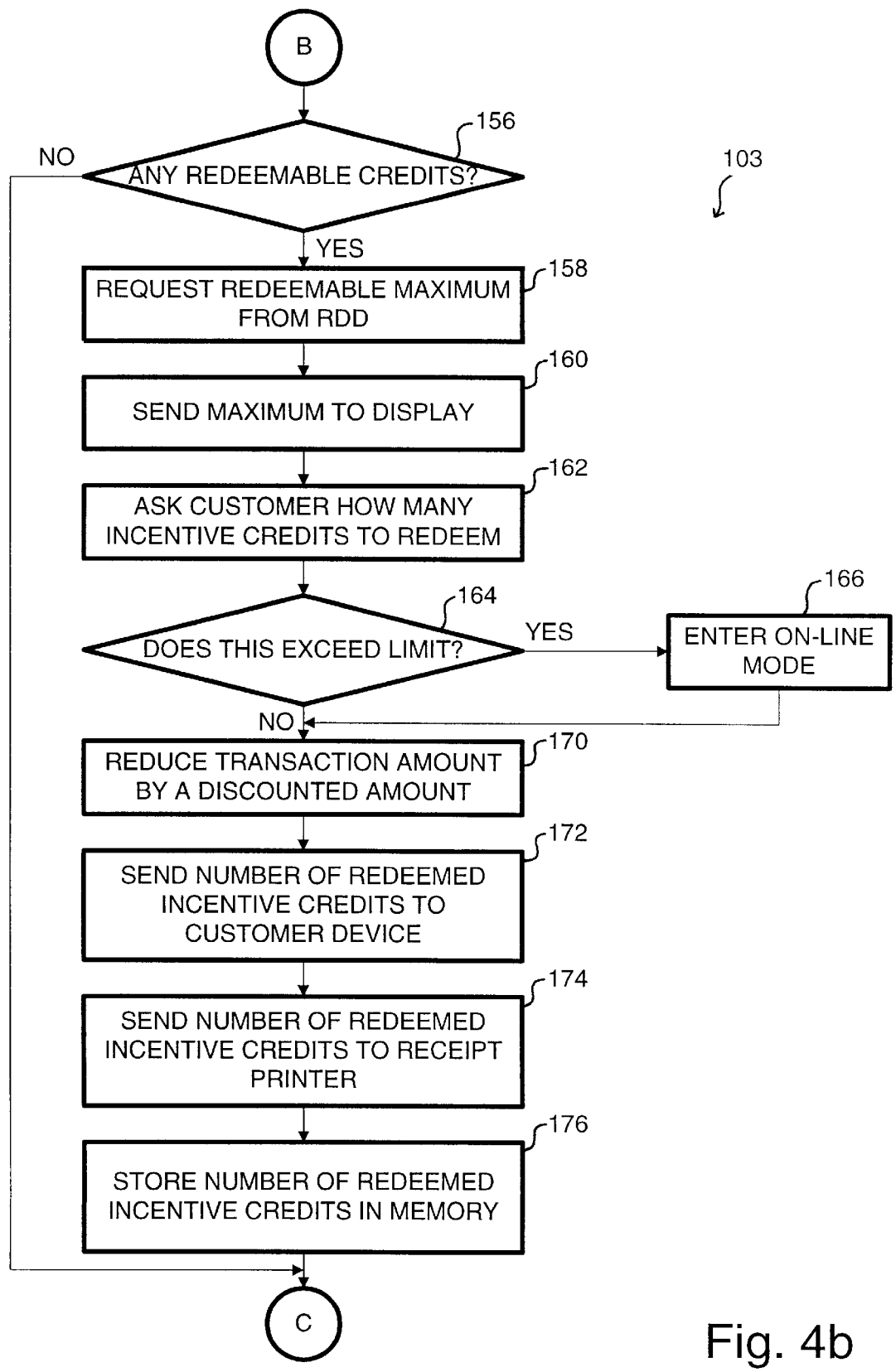
Figure 4C:
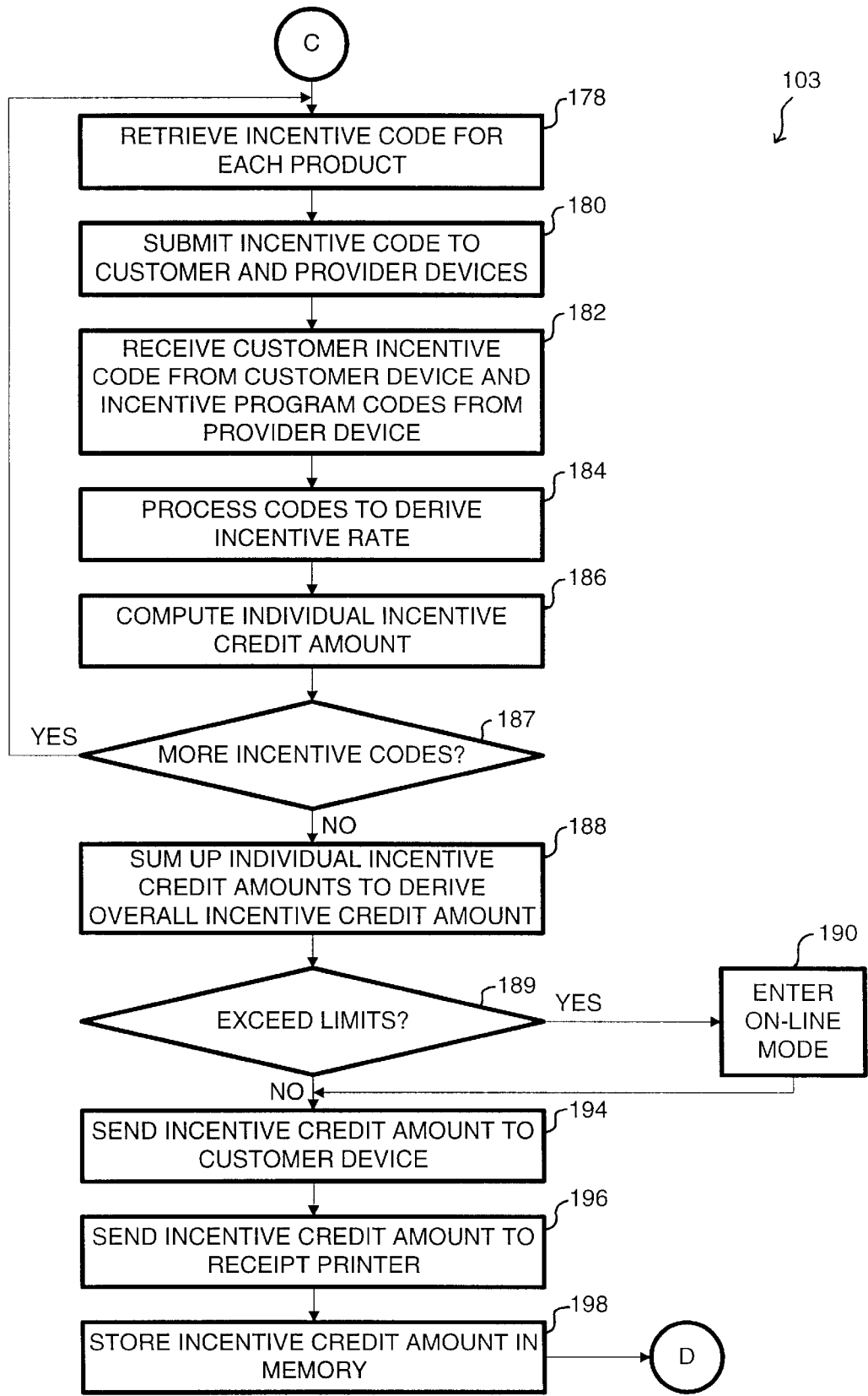
Figure 4D:
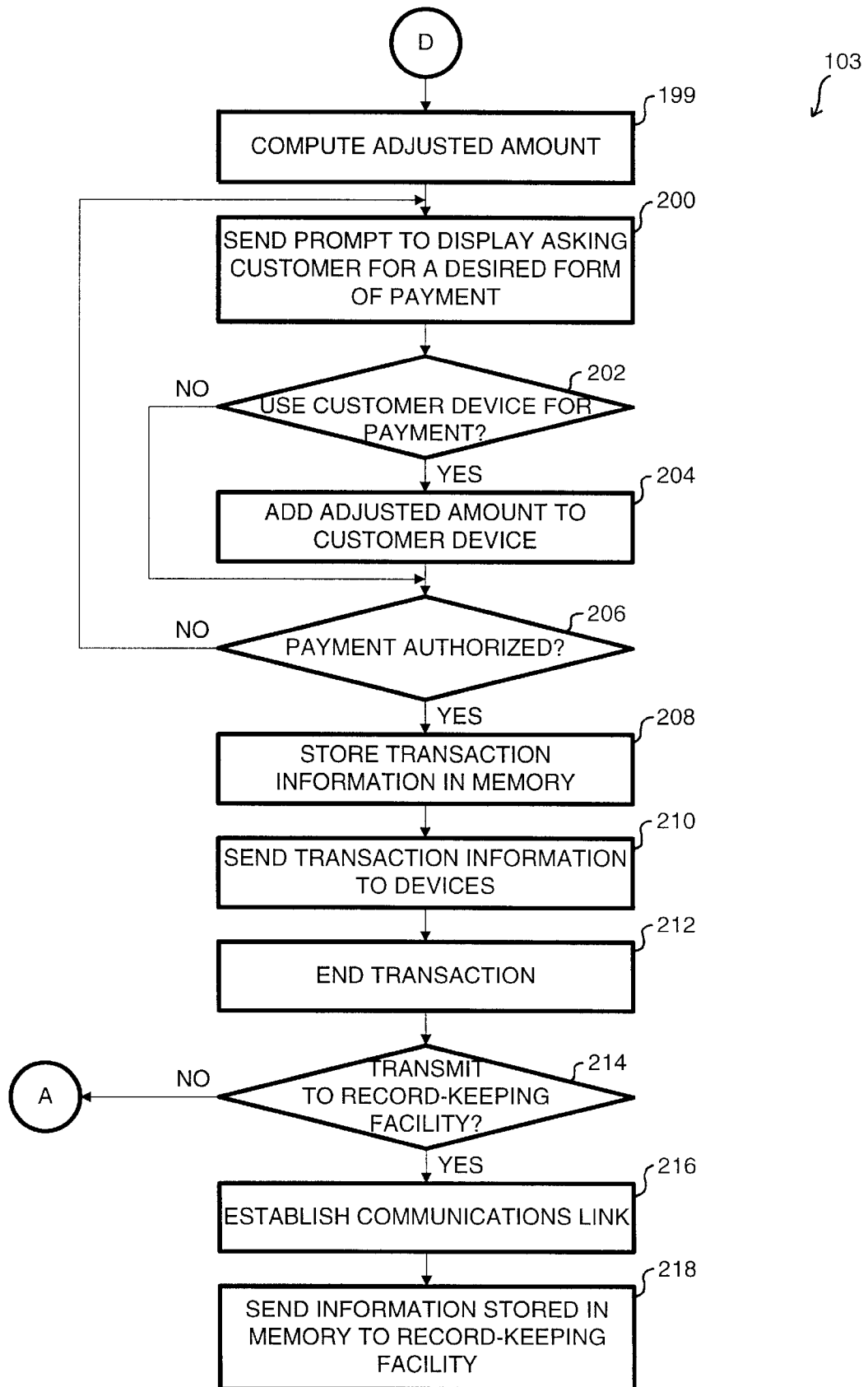

With reference to FIG. 3, there is shown a block diagram of a system 70 which may be utilized to implement the method of the present invention. System 70 preferably comprises a base device 72, a customer device 74, and a provider device 76. The customer and provider devices 74, 76 are both preferably portable devices which are coupled to the base device 72 through device interface 78.

As shown in FIG. 3, customer device 74 preferably comprises a customer processor 80 coupled to a read only memory (ROM) 82. ROM 82 contains within it a control program 84 which is executed by the processor 80 to carry out the operations required of the customer device. More will be said about the control program 84 in a subsequent section. Also coupled to the processor 80 is a random access memory (RAM) 86 and a non-volatile memory 88. RAM 86 is used as a scratch-pad memory for temporarily storing manipulated data while non-volatile memory 88 is used as a permanent memory for storing important information relating to the device 74. The information stored within non-volatile memory 88 includes: (1) a reference user code; (2) an incentive credit total which represents the number of incentive credits that have been accrued; (3) one or more customer incentive codes; (4) incentive program data such as account information, customer device identification, and telephone numbers of control centers; (5) financial transaction data such as an available credit or debit amount, the identification of a financial institution, the account numbers within the institution, financial rules, and the telephone number of the institution; (6) demographics of the customer; and (7) information relating to past transactions carried out using the device. As mentioned previously, device 74 is preferably a portable device. In the preferred embodiment, customer device 74 takes the form of a processor card or a "smart card" as it is sometimes known in the art. Card 74 may be an International Standards Organization (ISO) type "7816 IC card" or it may be a Personal Computer Memory Card International Association (PCMCIA) type card or it may be another type of card. The device interface 78 is preferably of the proper type to interface with the customer card 74. In the preferred embodiment, customer card 74 may be used for more than just implementing the incentive program. It may also be used as a debit card or a credit card to actually authorize payment of a transaction amount at the conclusion of a transaction. It is for this reason that financial transaction data is stored within the non-volatile memory 88. This aspect of device 74 will be elaborated upon in a later section.

Like customer device 74, provider device 76 also preferably takes the form of a processor card. Provider card 76 may be of the ISO type, PCMCIA type, or some other type of processor card. Card 76 is preferably of the same type as card 74 so that they may both share a single device interface 78. As shown in FIG. 3, provider card 76 preferably comprises a provider processor 90, a ROM 92, a RAM scratch-pad 96, and a non-volatile memory 98. The ROM 92 contains within it a control program 94 which is executed by the provider processor 90 to carry out the functions required of the provider device 76. The control program 94 will be described in a subsequent section. In provider device 76, non-volatile memory 98 is used as a permanent memory to store important information relating to the provider. This information includes: (1) incentive program data such as the provider's identification and telephone number; (2) a plurality of incentive program codes; (3) a reference provider code; and (4) information relating to transactions carried out using the provider card 76. In short, non-volatile memory 98 stores the provider-specific information needed to carry out a transaction.

The base device 72 of system 70 serves two major functions. First, it provides a mechanism for coordinating the interaction of the customer and provider devices 74, 76. Second, it provides a complete environment in which customer/provider transactions may be conducted. To carry out both of these function, base device 72 preferably comprises a base processor 100, memory 102, receipt printer 104, UPC code scanner 106, display 108, keyboard 110, communications interface 112, security application module receptacle 114, and device interface 78. All of these components 102-114, 78 are coupled to the base processor 100 by a common bus 101. The keyboard 110 and display 108 serve as the main interface to the customer and operator of the base device, while the receipt printer 104 provides a hard memorial of the transaction. The UPC scanner 106 serves as an input device for entering purchases into the base device while the communications interface 112 serves as a link to a communications network to allow the base device 72 to contact the outside world. The security application module receptacle 114 of base device 72 is an optional feature. For certain customer and provider cards, special procedures may need to be carried out in order to verify that the cards are valid. For such cards, a security application module 114 may need to be incorporated into the base device 72 to perform the special verification procedures. The security application module receptacle 114 may be used for incorporating such a module.

The memory 102 of base device 72 is probably the most important component in the device because it contains within it a control program 103 which, when executed by base processor 100, causes the processor 100 to carry out all of the functions necessary to conduct a transaction. Under control of program 103, processor 100 coordinates the interaction of the various devices, interfaces with the customer and operator of the base device, and processes the transaction. In addition to storing program 103, memory 102 may also be used to store information relating to the transaction.

Base device 72 may be implemented using only the components thus far described; however, in the preferred embodiment, base device 72 further comprises a removable data device (RDD) 116. Device 116, like the customer and provider devices 74, 76, is preferably a processor card which is coupled to the base processor 100 through device interface 78. RDD 116 preferably comprises a processor 118 coupled to a ROM 120, a RAM 124, and a non-volatile memory 126. ROM 120 contains a control program 122 which, when executed by processor 118, controls the operation of the RDD 116. Non-volatile memory 126, meanwhile, is used to store information necessary for conducting transactions. Such information includes: (1) product codes; (2) product prices and descriptions; (3) incentive codes; and (4) information relating to each transaction. It is possible to incorporate the functions and information of the RDD 116 into the control program 103 and memory 102 of the base device 72 and to eliminate the RDD 116 altogether. However, use of the RDD 116 is preferred because this allows base device 72 to be updated quickly and easily. For example, product prices may be updated by simply inserting an updated RDD 116 into the base device 72 instead of altering the contents of memory 102. Likewise, different functionality may be imparted to the base device 72 by inserting a newly programmed RDD 116 into the device rather than by altering control program 103. For the sake of convenience, RDD 116 is preferably included in the base device.

Figure 5:
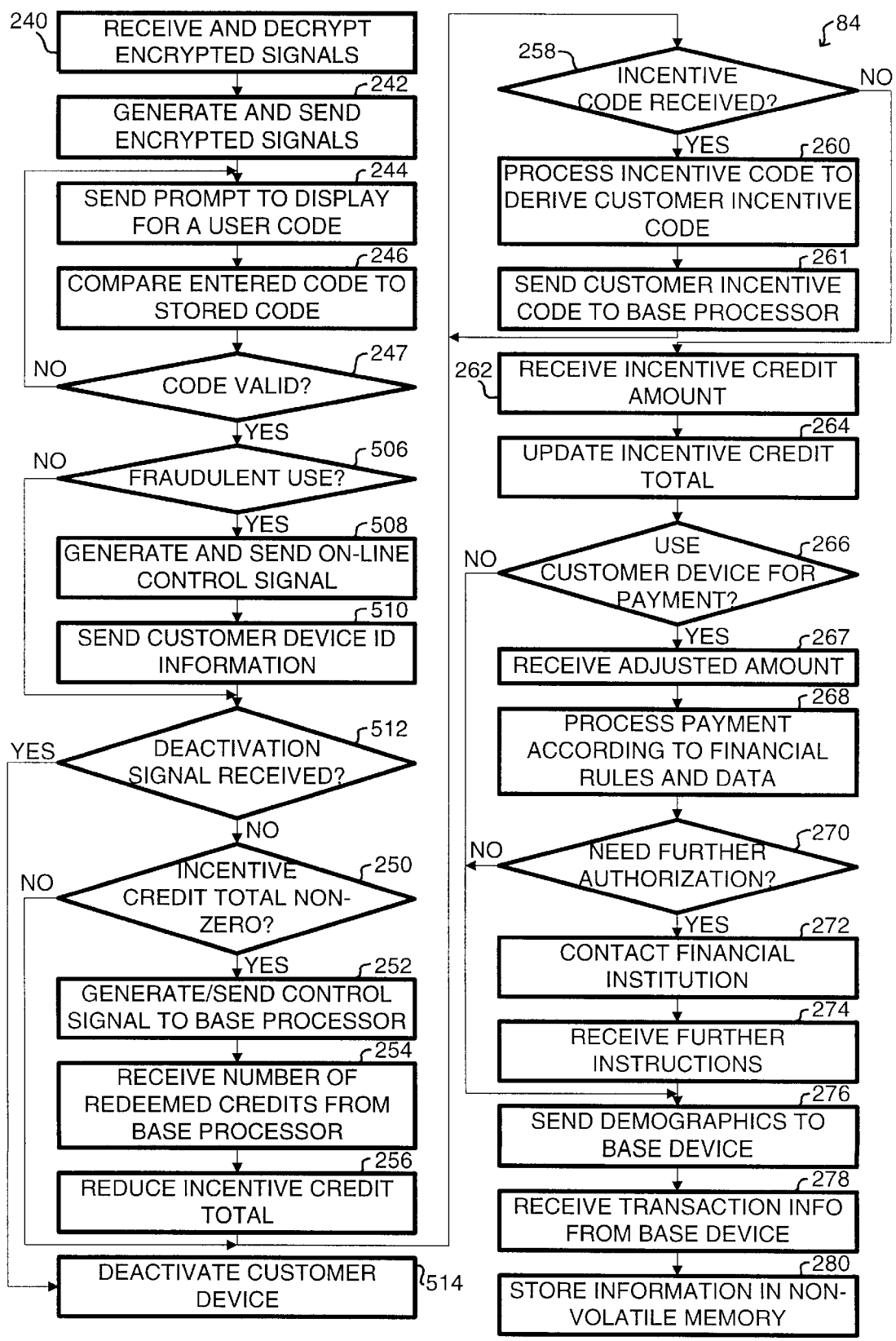
FIG. 5 is a flow diagram of the control program 84 executed by customer processor 80 of FIG. 3.
Figure 6:
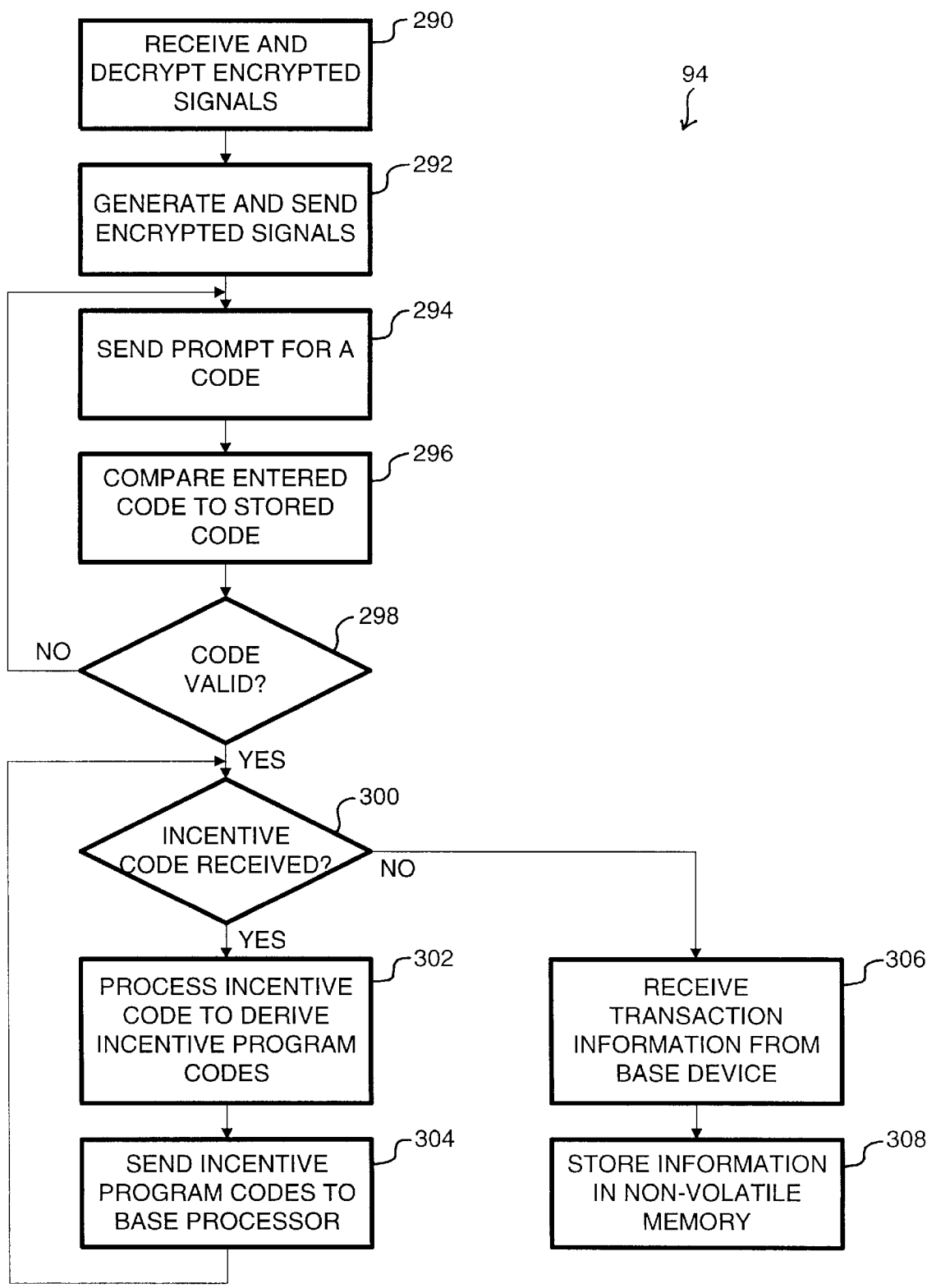
FIG. 6 is a flow diagram of the control program 94 executed by provider processor 90 of FIG. 3.
Figure 7:
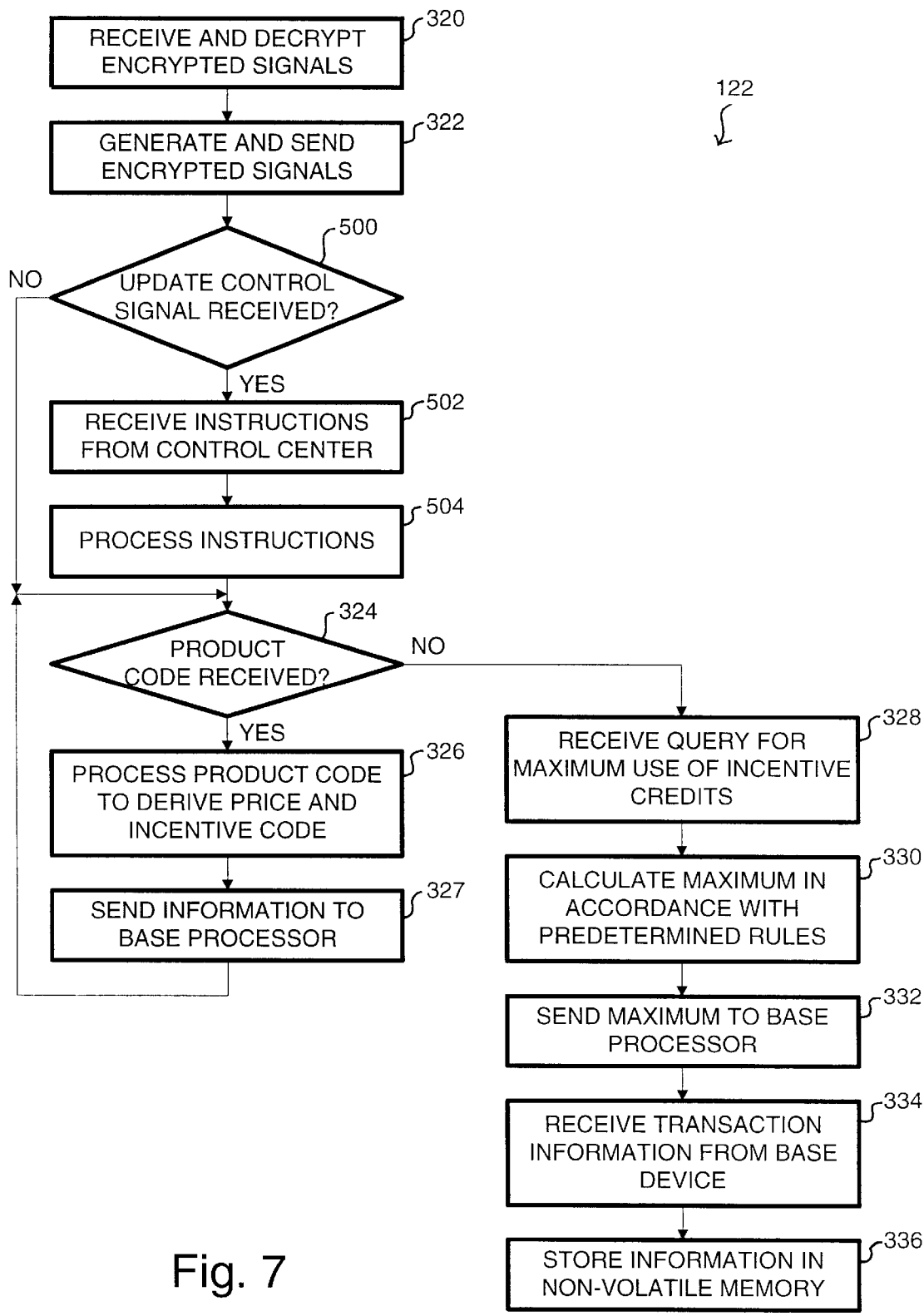
FIG. 7 is a flow diagram of the control program 122 executed by RDD processor 118 of FIG. 3.

The system 70 of the present invention is preferably an interactive system, that is, all of the devices 72, 74, 76, 116 in the system 70 cooperate to conduct a transaction. Because the devices work together, and because the control programs 84, 94, 103, 122 control the operation of the devices 72, 74, 76, 116, this means that the control programs are also interactive with each other. Since the control programs are interactive, their description is best understood if they are described in relation to one another. A flow diagram for the base control program 103 is provided in FIGS. 4a–4d, a flow diagram for the customer control program 84 is provided in FIG. 5, a flow diagram for the provider control program 94 is provided in FIG. 6, and a flow diagram for the RDD control program 122 is provided in FIG. 7. The operation of system 70 will be described with reference to these figures.

Figure 8:
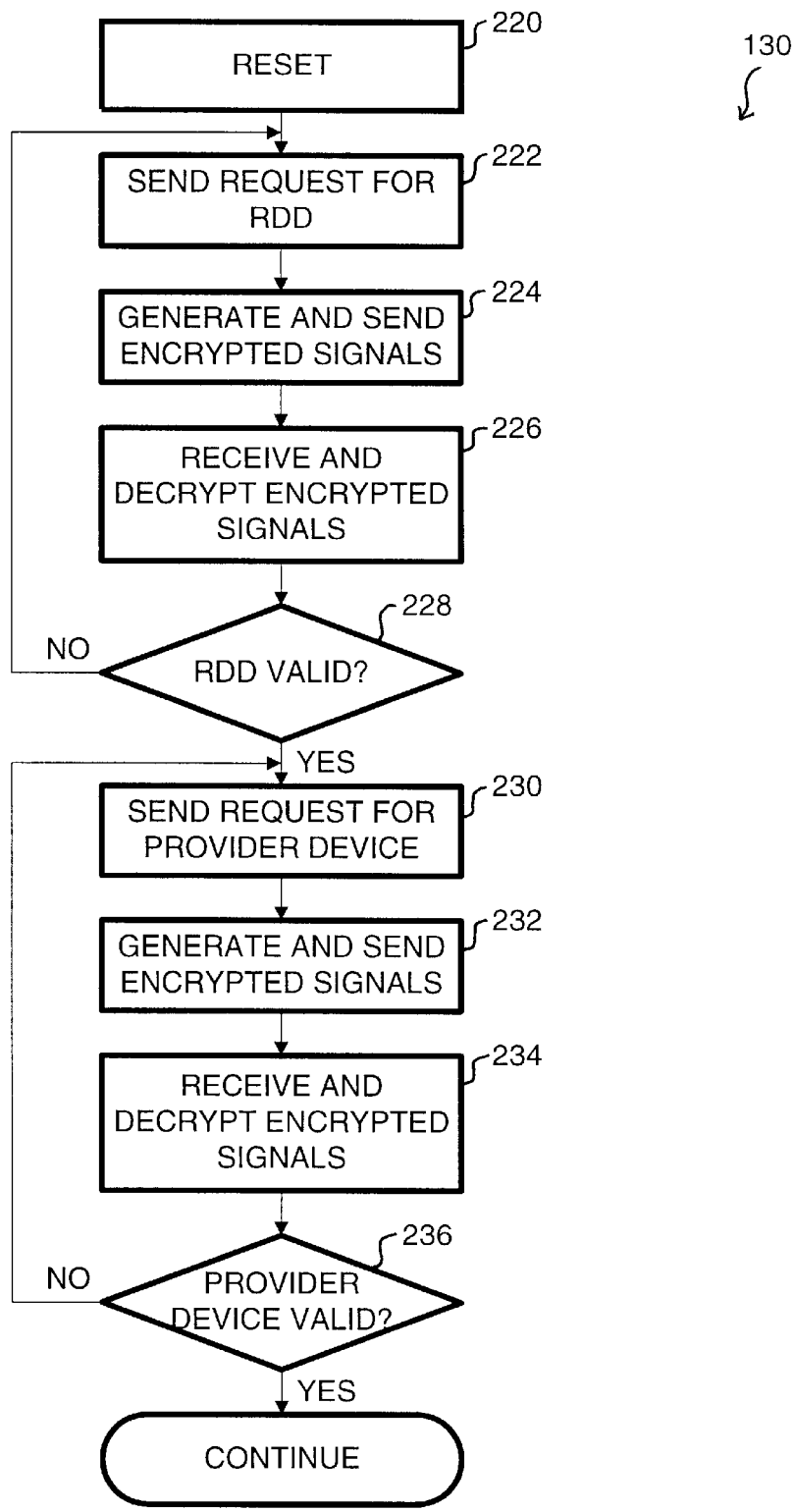

The operation of system 70 commences with an initialization process 130 carried out by the base processor 100. The initialization step, which is usually performed after an initial power-up, is illustrated in greater detail in FIG. 8, wherein the first step in the process is to reset 220 all counters, registers, and devices in the base device 72. After the reset procedure, base processor 100 sends a prompt to the display 108 to request 222 the insertion of a RDD 116. After the operator of the base device 72 complies with this request, base processor 100 initiates a verification process with the RDD 116 by generating and sending 224 a set of encrypted signals to the RDD 116. These signals pass from processor 100 to the RDD 116 via device interface 78. Hereinafter, it will be understood that signals pass between the base processor 100 and the devices 74, 76, 116 via the device interface 78. The RDD processor 118 responds by receiving 320 (FIG. 7) and decrypting the encrypted signals and, in turn, generating 322 and sending a set of encrypted signals of its own to the base processor 100. Base processor 100 receives and decrypts 226 (FIG. 8) these signals to determine whether the RDD is a valid device for use in a transaction. Preferably, all of the devices for use in the same incentive program are programmed with the same set of encryption and decryption keys so that the various devices can recognize each other. If base processor 100 determines 228 that the RDD 116 is not a valid device for use in a transaction, it ejects the inserted RDD and requests another one. On the other hand, if the RDD is valid, the initialization process is continued.

Base processor 100 next sends a prompt to the display 108 to request 230 insertion of a provider card 76. After a card is inserted, base processor 100 generates and send 232 another set of encrypted signals, this time, to the provider device 76. Provider processor 90 responds by receiving and decrypting 290 (FIG. 6) the encrypted signals, and generating and sending 292 its own set of encrypted signals. Base processor 100 receives and decrypts 234 (FIG. 8) these signals and, based on the decryption result, determines 236 whether the provider card 76 is a valid device. If invalid, the provider card is ejected and another card is requested. However, if the provider card is valid, then control is transferred to the provider card 76. Provider processor 90 accepts control and sends 294 (FIG. 6) a prompt to the display 108 requesting that the provider enter a provider code. The provider code is entered through the keyboard 110 and sent to the provider processor 90. Provider processor 90 compares 296 the entered code with a reference provider code stored in non-volatile memory 98 to determine 298 whether the entered code is valid. If invalid, another request is sent to the display, but if the entered code is valid, then control is transferred back to the base processor. The initialization process is thus completed. The system 70 is now ready to accept a customer card to commence a transaction.

Referring again to FIG. 4a, after initialization, base processor 100 sends a prompt to the display 108 to request 132 the insertion of a customer card. Upon insertion, base processor 100 generates and sends 134 a set of encrypted signals to the customer card. The customer processor 80 receives and decrypts 240 (FIG. 5) the encrypted signals, and responds by generating and sending 242 a set of encrypted signals to the base processor 100. The base processor 100 receives and decrypts 136 (FIG. 4a) these signals and determines 138 whether the customer card 74 is a valid device. If not, the inserted card is ejected and another request is sent to the display 108. However, if the card is a valid device, then control is transferred to the customer card 74. The customer processor 80 accepts control and sends 244 (FIG. 5) a prompt to the display 108 requesting the insertion of a user code by the customer. The requested user code, entered through keyboard 110, is received by the customer processor 80 and compared 246 to the reference user code stored in the non-volatile memory 88. If the codes do not match 247, then customer processor 80 requests that another user code be entered. However, if the entered user code is valid, then customer processor 80 proceeds to step 506.

Step 506 serves as an extra security check for ensuring that the customer is not using a lost or stolen customer card. In step 506, customer processor 80 checks for certain indications of possible fraudulent use. To elaborate, processor 80 determines whether the current transaction is the first transaction made using the customer card in a long period of time (a month, for instance). This might indicate that the card was lost and is now being used by an unauthorized user. Processor 80 also determines whether the current transaction amount is unusually high or exceeds a certain preset limit. In addition, processor 80 determines whether there has been an unusually large number of transactions conducted using the card. Processor 80 may check for other indications of possible fraudulent use of the customer card. Customer processor 80 has access to all of the information necessary for making the above determinations since information relating to past transactions made using the customer card is stored in non-volatile memory 88. If none of the above criteria are met, customer 80 transfers control back to base processor 100. However, if any of the above conditions is satisfied, customer processor 80 generates and sends 508 an on-line control signal to the base processor 100. Customer processor 80 further sends 510 control center information and customer card identification information to the base processor 100. The base processor 100 receives 139 (FIG. 4a) the control and information signals and, if the on-line control signal is active 140, processor 100 enters 141 into selective on-line mode to contact a common control center for further information, while processing all other functions off-line.

Figure 9:
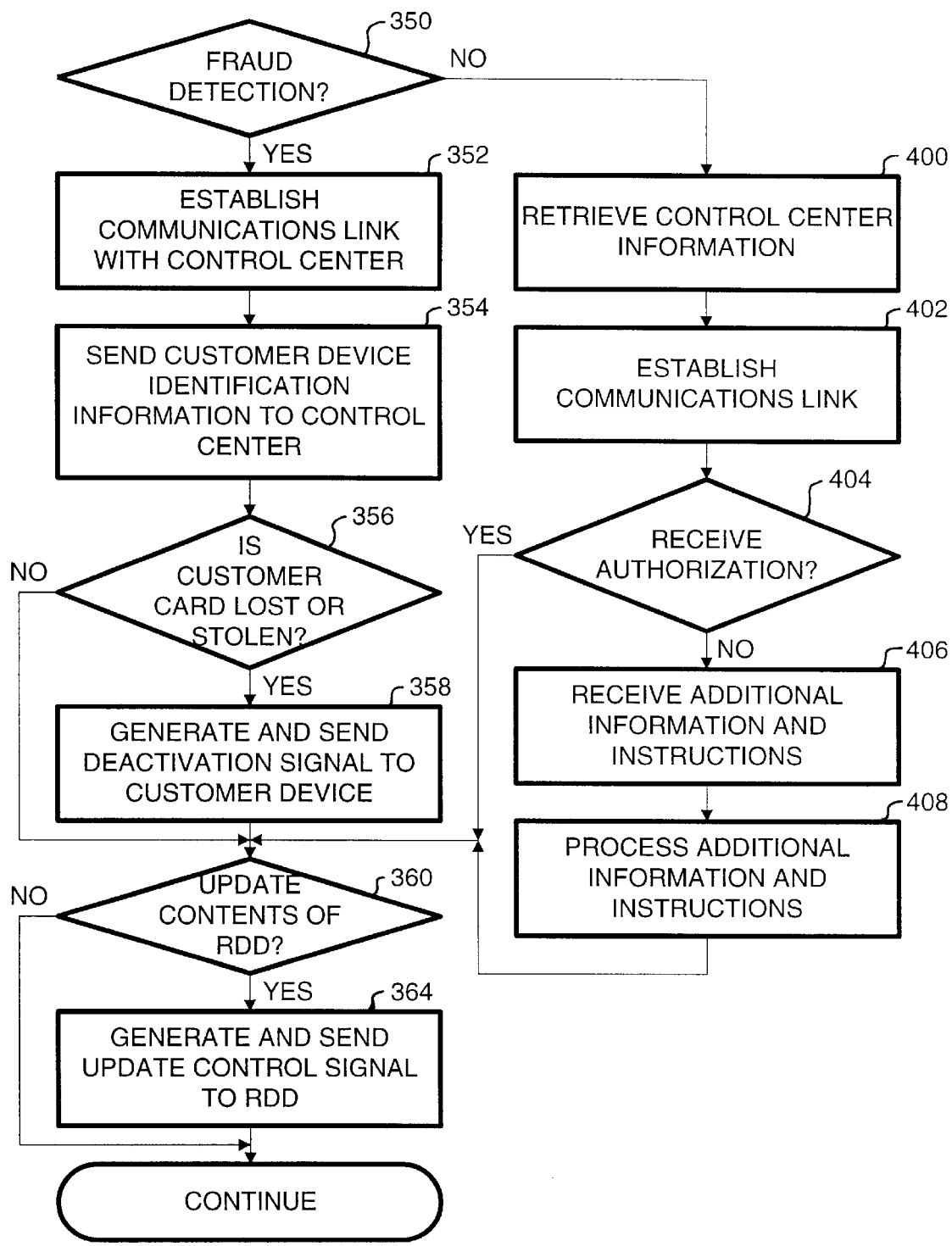
FIG. 9 is a flow diagram of the selective on-line mode of operation of base processor 100 of FIG. 3.

The selective on-line mode of operation is illustrated in detail in FIG. 9. Base processor 100 begins operation in this mode by determining 350 whether fraud detection is the reason for invoking this mode of operation. If so, base processor 100 uses the control center information received from customer processor 80 to establish 352 a communications link with the control center via communications interface 112. After the link is established, base processor 100 sends the customer card identification information to the common control center. The control center uses this identification information to determine whether the customer card 74 has been reported lost or stolen. If the customer card 74 is not lost or stolen, no action is taken and the customer card is allowed to participate in a transaction. However, if the customer card is determined 356 to have been lost or stolen, base processor 100 generates and sends 358 a deactivation signal to the customer device 74. Customer processor 80 receives this deactivation signal and, if the signal is active 512, customer processor 80 deactivates 514 the customer device 74 so that the device 74 can no longer be used to conduct the current transaction or any other future transaction. Thus, once a customer card is determined to be lost or stolen, it is deactivated to preclude the possibility of any future fraudulent use. This is in sharp contrast to magnetic stripe cards which cannot be deactivated. If a customer card is deactivated, base device 72 ejects the card and loops back to step 132 (FIG. 4a) to request another customer card.

If it is determined that all devices and users are valid, a transaction is commenced. Base processor 100 begins a transaction by receiving 142 a product or service code. This product code may be scanned in by way of UPC scanner 106 or it may be entered through the keyboard 110. Base processor 100 sends 144 this product code to the RDD 116 for processing. Upon receiving the product code, RDD processor 118 processes 326 (FIG. 7) the code to derive a product price, a product description, and an incentive code associated with the product. This step 326 is preferably carried out by performing a table look-up procedure through the non-volatile memory 126 where this information is stored. Once the information is found, RDD processor 118 sends 327 the information to the base processor 100. In response, base processor 100 receives 146 (FIG. 4a) the information, sends 148 it to the receipt printer 104 for printing, and stores 150 it temporarily in the memory 102. Thereafter, base processor 100 sends a prompt to the display 108 inquiring 152 whether more purchases are forthcoming. If more purchases are forthcoming, steps 142–150 are repeated. Note that the incentive code and the price for each product purchased is stored in memory 102. This information will be used subsequently when the incentive credit amount is computed. After all items are purchased, base processor 100 sums up all of the product prices to derive 154 a transaction amount. This transaction amount represents a subtotal of the items purchased.

After the transaction amount is derived, base processor 100 determines 156 whether the customer card 74 has any incentive credits to redeem. Base processor 100 makes this determination by checking the status of a control signal from customer processor 80. The status of this control signal depends upon the incentive credit total stored in the customer device non-volatile memory 88. In step 250 (FIG. 5), the customer processor 80 checks 250 the incentive credit total stored in non-volatile memory 88, and if this total is non-zero, then customer processor 80 generates and sends 252 a control signal to the base processor 100 to indicate the presence of redeemable incentive credits. Otherwise, no control signal is generated. Preferably, customer processor 80 provides only an indication of whether there are redeemable credits stored in non-volatile memory 88. Base processor 100 preferably is given no access to how many incentive credits are actually stored therein. This allows the incentive credit amount to remain private.

If the control signal from customer processor 80 indicates no redeemable incentive credits, then base processor 100 skips over the redemption steps 158–176. However, if there are redeemable credits, base processor 100 requests 158 a maximum redeemable amount from RDD 116. The RDD processor 118 receives 328 (FIG. 7) this query and calculates 330 a maximum according to a predetermined set of rules. These rules may take into account a plurality of factors. For example, perhaps only a certain amount of incentive credits may be applied towards a particular type of product. Perhaps some of the products may not be purchased at all using incentive credits. These rules may be set by the participants in the incentive program. After calculating this maximum amount, RDD processor 118 sends 332 the maximum to the base processor 100.

In response, base processor 100 sends 160 (FIG. 4*b*) the maximum amount to the display 108 to be shown thereon. This informs the customer of how many incentive credits he may redeem. Thereafter, base processor 100 sends 162 a prompt to display 108 to ask the customer how many incentive credits he wishes to redeem. In response, the customer enters the desired number through keyboard 110 and this number is received by base processor 100. Base processor 100 then determines 164 whether the entered amount exceeds authorized limits. There may be limits imposed on how many credits may be redeemed in one transaction or there may be other limits. If any one or a combination of these limits is exceeded, base processor 100 enters 166 into selective on-line mode to obtain further authorization. This aspect of the selective on-line mode of operation will be described in a later section. Where no limits are exceeded, base processor 100 applies the desired number of incentive credits to the transaction amount to reduce 170 the transaction amount by a discounted amount. Preferably, the discounted amount is equal to the number of incentive credits redeemed. Thereafter, the number of incentive credits redeemed is sent 172 to the customer card 74. The customer processor 80 receives 254 (FIG. 5) this number and reduces 256 the incentive credit total stored in non-volatile memory 88 by this number. After sending the number of redeemed credits to the customer card 74, base processor 100 sends 174 the redemption information to the receipt printer 104 for printing therefrom, and sends 176 the same information to memory 102 for storage therein. The redemption process is thus completed.

After the redemption process comes the incentive credit allocation process. Base processor 100 begins this process by retrieving 178 from the memory 102 the incentive code for one of the products purchased in the current transaction. Recall that the incentive codes for all of the purchased products were previously stored in memory 102; thus, this information is readily available to base processor 100. Base processor 100 submits 180 this incentive code to both the customer card 74 and the provider card 76. The customer processor 80 receives 258 (FIG. 5) this incentive code and processes 260 it to derive a customer incentive code. This step is preferably implemented by performing a table look-up procedure through the non-volatile memory 88 where the customer incentive code information is stored. Customer processor 80 then sends 261 the derived customer incentive code to the base processor 100 for processing. Similarly, provider processor 90 receives 300 (FIG. 6) the incentive code and processes 302 it to derive incentive program codes. Provider processor 90 preferably derives these codes by performing a table look-up procedure through non-volatile memory 98 where the incentive programs codes are stored. After retrieving the codes, provider processor 90 sends the codes to the base processor 100 for processing.

The base processor 100 receives 182 (FIG. 4*c*) the customer incentive code, other applicable incentive codes, and the incentive program codes and processes 184 them to derive an incentive rate. Preferably, this processing step is performed as previously described using either a cross-referencing or a summing approach. Once the incentive rate is obtained, it is applied to the purchase price (which is also stored in memory 102) of the purchased product to compute 186 the individual incentive credit amount attributable to that product. Thereafter, base processor 100 checks 187 the memory 102 for more incentive codes from the current transaction. For each incentive code, an individual incentive credit amount is computed. When all of the incentive codes have been processed, base processor sums up 188 all of the individual incentive credit amounts to derive an overall incentive credit amount. This amount is tested 189 by base processor 100 to determine whether it exceeds some authorized limit. It may be that only a certain maximum amount of incentive credits may be earned in any one transaction and that this amount exceeds that limit. If an authorized limit is exceeded, then base processor 100 enters 190 into selective on-line mode. This aspect of the selective on-line mode of operation will be described in a subsequent section. Otherwise, the incentive credit amount is sent 194 to the customer card 74. Customer processor 80 receives 262 (FIG. 5) this amount and, in response, updates 264 the incentive credit total stored in non-volatile memory 88 by adding the incentive credit amount to the incentive credit total. Thereafter, base processor 100 sends 196 (FIG. 4*c*) the incentive credit amount to the receipt printer 104 for printing therefrom and sends the same amount to the memory 102 for storage therein. The incentive credit allocation process is now completed.

The final phase of the transaction is the payment phase. Base processor 100 begins this phase by computing 199 the adjusted amount, which represents the difference between the transaction amount and the discounted amount. Then, base processor 100 sends a prompt to display 108 to ask 200 the customer what form of payment he desires. The answer to this prompt is entered via the keyboard and sent to the base processor 100. It was mentioned previously that, in the preferred embodiment, customer card 74 may be used as a debit card or a credit card to authorize payment. If this option is chosen 202, base processor 100 sends 204 the adjusted amount to the customer card 74. Otherwise, processor 100 checks for payment authorization.

If the customer card is to be used for payment, the customer processor 80 receives 267 (FIG. 5) the adjusted amount and processes 268 payment of the amount in accordance with the financial data and rules stored in non-volatile memory 88. When used as a debit card, there is typically sufficient information and authorization stored on the customer card to carry out payment off-line. In some instances, however, such as when the customer card 74 has insufficient resources to authorize the payment of the adjusted amount, further authorization or resource reallocation is needed. To obtain the authorization or resource reallocation, customer processor 80 contacts 272 the financial institution whose information is stored in non-volatile memory 88. This is preferably achieved by retrieving the phone number of the financial institution's control center from memory 88 and using communications interface 112 to establish a communications link with the control center. Then, by communicating with the control center, customer processor 80 receives 274 further instructions and information. As a result of this communication, processor 80 may obtain payment authorization or it may receive instructions to terminate the transaction without payment.

As mentioned above, the customer card may also be used as a credit card. Currently, credit card companies require that on-line authorization be obtained for most transactions. Thus, when customer card 74 is used as a credit card, a communications link is established with an appropriate authorizing entity to obtain payment authorization. This is preferably achieved by retrieving the phone number of the authorizing entity from memory 88 and using communications interface 112 to establish a communications link with the common control center. Then, by communicating with the authorizing entity, customer processor 80 can obtain the proper payment authorization.

Referring again to FIG. 4d, if payment authorization is received 206 by base processor 100, then the payment is carried out. But, if payment is not authorized, base processor 100 prompts the customer for another form of payment. Once the payment is authorized, all relevant transaction information is stored 208 in memory 102. This includes requesting and receiving demographics information from the customer device 74. Thereafter, base processor 100 sends 210 relevant transaction information to each of the devices 74, 76, 116 to allow each device to maintain in its non-volatile memory a journal of all transactions made using that device. After step 210, the transaction is terminated 212.

The operation described above is repeated for each transaction. During the course of a day, many transactions are conducted as off-line transactions. Information pertaining to all of these transactions is retained in memory 102. Preferably, at the end of a day, or some other period, data from memory 102 is transmitted to a record-keeping facility for records posting and account reconciliation. Base device 72 performs this procedure by first establishing a communications link with the record-keeping facility using communications interface 112, and then sending all of the transaction information stored within memory 102 to the facility. After transmitting the stored information, base device 72 is ready for another day of transactions.

In system 70, substantially all transactions are carried out off-line. However, there may be instances, such as where certain redemption or allocation limits are exceeded, in which the devices 72, 74, 76 lack the information or authorization to follow through with a transaction. In such instances, the selective on-line mode of the base processor is invoked. The fraud detection aspect of this operational mode was described previously. The authorization and information acquisition aspect of the selective on-line mode will now be described. With reference to FIG. 9, authorization and information acquisition begins with retrieving 400 control center information from one of the devices 74, 76, 116. Which device holds this information is a function of the additional information or authorization needed. Using this information and communications interface 112, base processor 100 establishes 402 a link with a common control center. Then, processor 100 requests authorization from the center for a specified operation. Where authorization is given, processing simply continues. However, where authorization is not obtained, base processor 100 receives 406 from the control center additional information and instructions. These instructions may order the processor 100 to limit the number of incentive credits that may be redeemed or allocated, or they may order the processor 100 to proceed with a certain operation. Base processor 100 processes 408 these instructions to carry out the desired functions.

Each time base processor 100 invokes the on-line mode of operation, the common control center is given the opportunity to update the contents of RDD 116. If base processor 100 determines 360 that the control center wishes to update RDD 116, base processor 100 generates and sends 364 an update control signal to the RDD 116. RDD processor 118 monitors 500 for this update control signal and, if the signal is active, RDD processor 118 receives 502 update instructions from the control center via communications interface 112 and processes 504 these instructions to implement the update. In this manner, a control center can keep the contents of the RDD 116 and hence, the base device 72, current. The selective on-line mode of the present invention is an advantageous feature because it allows routine decisions to be made by the customer, provider, and devices while, at the same time, providing a means for selectively contacting a common control center when difficult decisions arise, without interrupting the performance of other off-line functions. With this feature, the system of the present invention is able to offer the advantages of both an off-line system and an on-line system.

What is claimed is:

1. A method for allocating and redeeming incentive credits, said method comprising the steps of:

coupling a customer-carried, portable storage device to a first base device, said storage device having an incentive credit total stored thereon, conducting an off-line transaction between a customer and a first provider using said first base device to derive a first transaction amount;

deriving an incentive code for said first transaction amount;

processing said incentive code with a customer incentive code stored in said portable storage device and a program incentive code stored in a provider storage device, to derive an incentive rate;

applying said incentive rate to said first transaction amount to derive said incentive credit amount;

incrementing said incentive credit total stored on said storage device by said incentive credit amount to derive a new incentive credit total;

storing said new incentive credit total onto said storage device;

coupling said storage device to a second base device;

conducting a second off-line transaction between the customer and a second provider using said storage device and said second base device to derive a second transaction amount;

applying, by said second base device, at least a portion of said new incentive credit total to said second transaction to reduce said second transaction amount;

subtracting the portion of the new incentive credit total applied from said new incentive credit total to derive a reduced incentive credit total; and storing said reduced incentive credit total onto said storage device.

2. The method of claim 1, further comprising the steps of:

prior to conducting said first transaction, verifying that said portable storage device is a valid device for use with said first base device; and prior to conducting said second transaction, verifying that said portable storage device is a valid device for use with said second base device.

3. The method of claim 1, further comprising the step of:

recording information relating to said first and second transactions in said portable storage device to maintain a journal of all transactions made using said portable storage device.

4. The method of claim 1, further comprising the steps of:

recording information relating to said first transaction, including said incentive credit amount, in said first base device;

recording information relating to said second transaction in said second base device;

transmitting the information stored in said first and second base devices to a record-keeping facility after said first and second transactions are completed.

5. The method of claim 4, further comprising the step of:

paying, by said first provider, an amount proportional to said incentive credit amount into a trust account.

6. The method of claim 4, further comprising the step of:

receiving, by said second provider from said trust account, payment in an amount proportional to the portion of said new incentive credit total applied to reduce said second transaction amount.

7. The method of claim 1, wherein said first and second providers are the same entity.

8. The method of claim 1, wherein said first and second base devices are the same device.

9. A method for allocating and redeeming incentive credits, said method comprising the steps of:

coupling a customer-carried, portable storage device to a base device, said storage device having an incentive credit total stored thereon representing previously earned incentive credits;

conducting an off-line transaction between a customer and a provider using said base device to derive a transaction amount;

applying by said base device at least a portion of said incentive credit total to said transaction amount to reduce said transaction amount by a discounted amount;

updating said incentive credit total by subtracting the portion of said incentive credit total applied from said incentive credit total;

deriving an incentive code for said transaction amount;

processing said incentive code with a customer incentive code stored in said portable storage device and an incentive program code stored in a provider storage device to derive an incentive rate;

applying said incentive rate to said transaction amount to derive said incentive credit amount updating said incentive credit total by incrementing said incentive credit total by said incentive credit amount; and storing said incentive credit total, as updated, onto said storage device.

10. The method of claim 9, further comprising the step of:

prior to conducting said transaction, verifying that said portable storage device is a valid device for use in said transaction.

11. The method of claim 9, further comprising the step of:

recording information relating to said transaction in said portable storage device to maintain a journal of all transactions made using said portable storage device.

12. The method of claim 9, further comprising the steps of:

recording information relating to said transaction, including said discounted amount and said incentive credit amount, in said base device; and transmitting the information stored in said base device to a record-keeping facility after said transaction is completed.

13. The method of claim 12, further comprising the step of:

receiving, by said provider, payment in an amount proportional to said discounted amount from a trust account.

14. The method of claim 13, further comprising the step of:

paying, by said provider, an amount proportional to said incentive credit amount into said trust account.

15. A system for allocating and redeeming incentive credits, said system comprising:

a customer-carried portable device comprising a customer memory having a customer incentive program code stored therein;

a first base device for coupling to and operating with said portable device, said first base device comprising a first customer interface, a first base processor coupled to said first interface, and a base memory coupled to said first base processor and having at least one incentive code stored therein, said first base processor conducting a first off-line transaction with a customer via said first interface to derive a first transaction amount;

a provider device coupled to said first base device, said provider device comprising a provider memory having at least one incentive program code stored therein, wherein said first base processor computes an incentive credit amount by retrieving said incentive code from said base memory, retrieving said customer incentive code from said customer memory, retrieving said incentive program code from said provider memory, processing said incentive code with said customer incentive code and said incentive program code to derive an incentive rate, and applying said incentive rate to said first transaction amount to derive said incentive credit amount, and wherein said first base sends said incentive credit amount to said portable device for storage within said customer memory; and a second base device for coupling to and operating with said portable device after said portable device is decoupled from said first base device, said second base device comprising a second customer interface and a second base processor coupled to said second interface, said second base processor conducting a second off-line transaction with the customer via said second interface to derive a second transaction amount, said second base processor applying at least a portion of said incentive credit amount stored in said customer memory to said second transaction amount to reduce said second transaction amount by a discounted amount.

16. The system of claim 15, wherein said portable device further comprises a customer processor coupled to said customer memory, said customer processor receiving said incentive credit amount from said first base processor and adding said incentive credit amount to an incentive credit total stored in said customer memory to update said incentive credit total.

17. The system of claim 15, wherein said portable device further comprises a customer processor coupled to said customer memory, said customer processor receiving a user code from said first base device via said first customer interface and comparing said user code to a reference user code stored in said customer memory to determine whether said user code is invalid, and in response to a determination that said user code is invalid, said customer processor precluding further interaction with said portable device.

18. The system of claim 15, wherein said portable device further comprises a customer processor coupled to said customer memory, said customer processor sending and receiving encrypted signals to and from said base processor to verify that said base device and said portable device are valid devices for use in said transaction.

19. The system of claim 15, wherein said provider device further comprises a provider processor coupled to said provider memory, said provider processor receiving a provider code from said first base device via said first customer interface and comparing said provider code to a reference provider code stored in said provider memory to determine whether said provider code is invalid, and in response to a determination that said provider code is invalid, said provider processor precluding further interaction with said provider device.

20. The system of claim 15, wherein said provider device further comprises a provider processor coupled to said provider memory, said provider processor sending and receiving encrypted signals to and from said base processor to verify that said base device and said provider device are valid devices for use in said transaction.

21. The system of claim 15, wherein said portable device further comprises a customer processor coupled to said customer memory and wherein said first base device further comprises a communications interface, said customer processor determining, based on a set of authorization parameters stored in said customer memory, whether to authorize payment of said first transaction amount and, in response to a determination not to authorize payment, said customer processor communicating with a financial institution via said communications interface to obtain payment authorization therefrom.

22. The system of claim 15, wherein said first base device further comprises a communications interface coupled to said first base processor, wherein said base memory includes a set of authorization parameters stored therein, and wherein said base processor determines, based on said authorization parameters, whether sufficient authorization exists to complete said first transaction, and in response to a determination that additional authorization is needed, said first base processor communicating with a control center via said communications interface to obtain additional authorization therefrom.

23. The system of claim 15, wherein said first base processor stores information relating to said first transaction, including said incentive credit amount, in said base memory.

24. The system of claim 23, wherein said first base device further comprises a communications interface coupled to said first base processor, and wherein said first base processor transmits the information stored in said base memory to a record-keeping facility via said communications interface after said first transaction is completed.

25. The system of claim 15, wherein said portable device further comprises a customer processor coupled to said customer memory, wherein said customer memory further contains information relating to past transactions conducted using said portable device, wherein said first base device further comprises a communications interface coupled to said first base processor, and wherein:

said customer processor determines, based on the information relating to past transactions and information relating to said first transaction, whether an indication of fraudulent use of said portable device exists, and in response to a determination that said indication exists, said customer processor sending portable device identification information to said first base processor, said first base processor sending said portable device identification information to a control center via said communications interface to obtain from said control center a determination as to whether said portable device is being used fraudulently, and in response to a determination that said portable device is being used fraudulently, said first base processor sending a deactivation signal to said portable device.

26. The system of claim 25, wherein said customer processor receives said deactivation signal and responds by deactivating said portable device.

27. A system for allocating and redeeming incentive credits, said system comprising:

a customer-carried portable device comprising a customer memory having an incentive credit total stored therein representing incentive credits earned in previous transactions and a customer incentive code stored therein, and a customer processor coupled to said customer memory, said customer processor, in response to receiving an incentive credit redeemed amount, subtracting said redeemed amount from said incentive credit total to update said incentive credit total stored in said customer memory, said customer processor, in response to receiving an incentive credit amount, adding said incentive credit amount to said incentive credit total to update said incentive credit total;

a base device operatively coupled to said portable device said base device comprising a customer interface, a base processor coupled to said interface, and a base memory coupled to said base processor and having at least one incentive code stored therein, said base processor conducting an off-line transaction with a customer via said interface to derive a transaction amount, said base processor applying at least a portion of said incentive credit total, referred to as said incentive credit redeemed amount, to said transaction amount to reduce said transaction amount by a discounted amount, said base processor sending said incentive credit redeemed amount to said customer processor for updating said incentive credit total; and a provider device coupled to said base device, said provider device comprising a provider memory having at least one incentive program code stored therein, wherein said base processor computes said incentive credit amount by retrieving said incentive code from said base memory, retrieving said customer incentive code from said customer memory, retrieving said incentive program code from said provider memory, processing said incentive code with said customer incentive code and said incentive program code to derive an incentive rate, and applying said incentive rate to said transaction amount to derive said incentive credit amount, and wherein said incentive credit amount represents incentive credits earned in said off-line transaction, and wherein said base processor sends said incentive credit amount to said customer processor for further updating said incentive credit total.

28. The system of claim 27, wherein said customer processor, in addition to updating said incentive credit total, further receives a user code from said base device via said customer interface and compares said user code to a reference user code stored in said customer memory to determine whether said user code is invalid, and in response to a determination that said user code is invalid, said customer processor precluding further interaction with said portable device.

29. The system of claim 27, wherein said provider device further comprises a provider processor coupled to said provider memory, and wherein said provider processor receives a provider code from said base device via said customer interface and compares said provider code to a reference provider code stored in said provider memory to determine whether said provider code is invalid, and in response to a determination that said provider code is invalid, said provider processor precluding further interaction with said provider device.

30. The system of claim 27, wherein said base device further comprises a communications interface, and wherein said customer processor determines, based on a set of authorization parameters stored in said customer memory, whether to authorize payment of said transaction amount and, in response to a determination not to authorize payment, said customer processor communicates with a financial institution via said communications interface to obtain payment authorization therefrom.

31. The system of claim 27, wherein said base device further comprises a communications interface coupled to said base processor, wherein said base memory includes a set of authorization parameters stored therein, and wherein said base processor determines, based on said authorization parameters, whether sufficient authorization exists to complete said transaction, and in response to a determination that additional authorization is needed, said base processor communicates with a control center via said communications interface to obtain additional authorization therefrom.

32. The system of claim 27, wherein said base device further comprises a base memory coupled to said base processor, and wherein said base processor stores information relating to said transaction, including said incentive credit amount, in said base memory.

33. The system of claim 32, wherein said base device further comprises a communications interface coupled to said base processor, and wherein said base processor transmits the information stored in said base memory to a record-keeping facility via said communications interface after said transaction is completed.

34. The system of claim 27, wherein said customer memory further contains information relating to past transactions conducted using said portable device, wherein said base device further comprises a communications interface coupled to said base processor, and wherein:

said customer processor determines, based on the information relating to past transactions and information relating to said first transaction, whether an indication of fraudulent use of said portable device exists, and in response to a determination that said indication exists, said customer processor sending portable device identification information to said base processor, said base processor sending said portable device identification information to a control center via said communications interface to obtain from said control center a determination as to whether said portable device is being used fraudulently, and in response to a determination that said portable device is being used fraudulently, said base processor sending a deactivation signal to said portable device.

35. The system of claim 34, wherein said customer processor receives said deactivation signal and responds by deactivating said portable device.

36. A base device for operating with a customer-carried portable device to allocate and redeem incentive credits, said portable device comprising a customer memory having an incentive credit total stored therein representing incentive credits earned in previous transactions, and for operating with a provider device, said provider device comprising a provider memory having an incentive code stored therein, said base device comprising:

portable device interface for coupling to said portable device;

provider device interface for coupling to said provider device;

customer interface; and a base processor coupled to said portable device interface, said customer interface, and said provider device interface, said base processor conducting an off-line transaction with a customer via said customer interface to derive a transaction amount, said base processor receiving from the customer via said customer interface an indication of a selected portion of said incentive credit total, referred to as the incentive credit redeemed portion, to apply to said transaction amount, said base processor receiving from said provider device via said provider device interface the incentive code, said base processor applying said incentive credit redeemed portion and said incentive code to said transaction amount to reduce said transaction amount by a discounted amount, said base processor sending said incentive credit redeemed portion to said portable device via said portable device interface, said base processor further, computing an incentive credit amount based on said transaction amount and said incentive code, said incentive credit amount representing incentive credits earned in said off-line transaction, said base processor sending said incentive credit amount to said portable device via said portable device interface.

* * * * *